(12) United States Patent
Hofmann

(10) Patent No.: US 7,761,211 B2
(45) Date of Patent: Jul. 20, 2010

(54) METHOD FOR A SHIFT CONTROL OF A DRIVETRAIN OF A MOTOR VEHICLE

(75) Inventor: Lars Hofmann, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 523 days.

(21) Appl. No.: 11/897,876

(22) Filed: Aug. 31, 2007

(65) Prior Publication Data
US 2008/0059032 A1   Mar. 6, 2008

(30) Foreign Application Priority Data
Sep. 1, 2006   (DE)  ........................ 10 2006 041 155

(51) Int. Cl.
*G06F 7/00* (2006.01)
(52) U.S. Cl. ...................................................... 701/51
(58) Field of Classification Search .................. 701/51, 701/54, 84, 95; 477/5, 7–8, 15, 34, 39, 77
See application file for complete search history.

(56) References Cited

U.S. PATENT DOCUMENTS

| | | | | |
|---|---|---|---|---|
| 6,920,383 | B2 * | 7/2005 | Graf et al. | 701/51 |
| 7,363,122 | B2 * | 4/2008 | Bischoff | 701/22 |
| 2005/0119805 | A1 | 6/2005 | Bischoff | |

FOREIGN PATENT DOCUMENTS

| | | |
|---|---|---|
| DE | 44 40 706 C2 | 5/1996 |
| DE | 10202531 A1 | 8/2003 |

OTHER PUBLICATIONS

Search Report issued by the German Patent and Trademark Office, dated Apr. 15, 2008.

* cited by examiner

*Primary Examiner*—Kim T Nguyen
(74) *Attorney, Agent, or Firm*—Manfred Beck, P.A.

(57) ABSTRACT

A method for a shift control of a drivetrain of a motor vehicle includes providing the drivetrain of the motor vehicle as a hybrid drivetrain wherein an electric machine is connected to an input shaft of an automated stepped shift transmission and wherein an internal combustion engine is connected to the input shaft of the automated stepped shift transmission via a decoupling clutch. Currently valid shift characteristic curves used for triggering respective shifts of the automated stepped shift transmission are determined respectively in dependence of current driving and operating parameters by performing an interpolation between a first limit shift characteristic curve for a first driving characteristic and a second limit shift characteristic curve for a second driving characteristic wherein the respective limit shift characteristic curves are identical in all operating modes, however a permissible interpolation range in a purely electric operation is limited.

12 Claims, 2 Drawing Sheets

METHOD FOR A SHIFT CONTROL OF A DRIVETRAIN OF A MOTOR VEHICLE

CROSS-REFERENCE TO RELATED APPLICATION

This application claims the priority, under 35 U.S.C. §119, of German Patent Application No. DE 10 2006 041 155.2, filed Sep. 1, 2006; the prior application is herewith incorporated by reference in its entirety.

BACKGROUND OF THE INVENTION

Field of the Invention

The invention relates to a method for a shift control of a drivetrain of a motor vehicle, wherein an internal combustion engine is connected, via a decoupling clutch, with the input shaft of an automated stepped shift transmission and wherein the shift characteristic curves, which are used for triggering the shifts of the stepped shift transmission, are determined in each case by an interpolation between two limit shift characteristic curves.

In case of a motor vehicle equipped with an automated stepped shift transmission, such as a planetary gear automatic transmission (ATG) or an automated shift transmission (ASG), the shift processes, such as upshifts and downshifts, are triggered, starting with the engaged gear, in each case in dependence of the current position of the accelerator pedal or of an associated final control element for power of the drive motor, such as for example of a throttle valve, and the current driving speed or the engine speed by using available shift characteristic curves stored in a characteristic diagram memory (input output map memory) of an associated electronic transmission control (EGS). In order to meet the requirements of a wide variety of possible driving and operating situations as well as the special requirements of different drivers, it would be necessary to determine and store a large number of shift characteristic curves, and a complex selection procedure would be necessary for determining the optimal shift characteristic curves in each case. In order to avoid this high expenditure, it is possible to determine and store only a few so-called limit shift characteristic curves, and to carry out an adaptation to the respective driving and operating situation and the requirements of the driver by determining the currently valid shift characteristic curves in the form of an interpolation between respective two limit shift characteristic curves.

For example, German Patent No. DE 44 40 706 C2 discloses a method for a shift control of an automatic transmission in which, for every possible gear shift, such as for example an upshift from the third gear to the fourth gear, three shift characteristic curves are determined and are stored, namely a shift characteristic curve for a steep uphill drive, a shift characteristic curve for driving on a level surface, and a shift characteristic curve for a steep downhill drive. In order to determine the currently valid shift characteristic curves in case of an uphill drive, an interpolation is performed in each case between the relevant shift characteristic curves for a steep uphill drive and for a drive on a level surface, and in case of a downhill drive, an interpolation is performed in each case between the relevant shift characteristic curves for a drive on a level surface and for a steep downhill drive. For this purpose it is provided that a hill slope factor characterizing the currently driven slope and a hill profile factor characterizing the currently driven route profile are determined from sensor data and are processed to provide a resultant hill factor, which in this case is done by selecting the larger one of the two factors. The hill factor that is obtained in this manner, is used as an interpolation factor for determining the current valid shift characteristic curves.

However there are also motor vehicles whose drivetrain is embodied as a hybrid drivetrain with an internal combustion engine and an electric machine provided in a parallel configuration. In this case the motor vehicle can be driven in three modes of operation, first, in a pure internal combustion engine operation wherein a decoupling clutch, which is disposed between the internal combustion engine and the input shaft of the stepped shift transmission, is closed and wherein the electric machine is switched to be without power, second, in a mixed operation wherein the internal combustion engine is in operation, the decoupling clutch is closed and the electric machine is in operation, and third, in a pure electric operation wherein the internal combustion engine is turned off, the decoupling clutch is opened and the electric machine is in operation. The electric machine can furthermore be operated selectively as a motor or as a generator. Because the internal combustion engine and the electric machine have in each case different operation properties, there is a need in case of such a motor vehicle equipped with a hybrid drivetrain to have at disposal or to determine respective suitable shift characteristic curves for every mode of operation that are optimally customized for the respective driving and operating conditions, that in particular allow a favorable fuel consumption of the internal combustion engine if required and a high efficiency of the electric machine and/or meet requirements of a driver concerning desired driving dynamics.

SUMMARY OF THE INVENTION

It is accordingly an object of the invention to provide a method for a shift control of a drivetrain of a motor vehicle which overcomes the above-mentioned disadvantages of the heretofore-known methods of this general type and which determines in all modes of operation, in each case by an interpolation between two limit shift characteristic curves, valid shift characteristic curves which are an optimal adaptation to current driving and operating conditions.

With the foregoing and other objects in view there is provided, in accordance with the invention, a method for a shift control of a drivetrain, which includes the steps of:

providing a drivetrain of a motor vehicle as a hybrid drivetrain wherein an electric machine is connected to an input shaft of an automated stepped shift transmission and wherein an internal combustion engine is connected to the input shaft of the automated stepped shift transmission via a decoupling clutch; and determining currently valid shift characteristic curves used for triggering respective shifts of the automated stepped shift transmission respectively in dependence of current driving and operating parameters by performing an interpolation between a first limit shift characteristic curve for a first driving characteristic and a second limit shift characteristic curve for a second driving characteristic wherein the respective limit shift characteristic curves are identical in all operating modes, however a permissible interpolation range in a purely electric operation is limited.

Another mode of the method according to the invention includes using eco-shift characteristic curves for a particularly economical driving characteristic as limit shift characteristic curves for the first driving characteristic; and using sport-shift characteristic curves for a particularly sporty driving characteristic as limit shift characteristic curves for the second driving characteristic.

Yet another mode of the method according to the invention includes deriving a dynamics factor from driving and operating parameters determined during a driving operation, the driving and operating parameters characterizing a driver type and/or driving dynamics of the motor vehicle; and using the dynamics factor as an interpolation value for determining the currently valid shift characteristic curves wherein a dynamics factor of zero means that the valid shift characteristic curves coincide with respective eco-shift characteristic curves and a dynamics factor of one means that the valid shift characteristic curves coincide with respective sport-shift characteristic curves.

Another mode of the method according to the invention includes periodically detecting driver-specific driving dynamics data by using position and movement sensors of driving control elements of the motor vehicle; and evaluating the driver-specific driving dynamics data in order to derive the dynamics factor.

A further mode of the method according to the invention includes periodically detecting vehicle-specific driving dynamics data by using linear and angular acceleration sensors of the motor vehicle; and evaluating the vehicle-specific driving dynamics data in order to derive the dynamics factor.

Another mode of the method according to the invention includes limiting the permissible interpolation range in a purely electric operation by restricting the dynamics factor to values above a lower limit value such that the values are greater than zero.

Another mode of the method according to the invention includes limiting the permissible interpolation range in a purely electric operation by restricting the dynamics factor to values below an upper limit value such that the values are less than one.

Another mode of the method according to the invention includes limiting the permissible interpolation range when the electric machine is in a motor operation by restricting the dynamics factor to values above the lower limit value in order to achieve an increased drive power.

A further mode of the method according to the invention includes limiting the permissible interpolation range when the electric machine is in a generator operation by restricting the dynamics factor to values above the lower limit value in order to achieve an increased recuperation and braking power.

Another mode of the method according to the invention includes limiting the permissible interpolation range during a motor operation and a generator operation of the electric machine in order to achieve an increased electric efficiency by restricting the dynamics factor to values below the upper limit value.

Yet another mode of the method according to the invention includes performing a change-over between a purely internal combustion engine operation and a purely electric operation by providing a continuous transition between a maximum interpolation range and a limited interpolation range.

Another mode of the method according to the invention includes performing a change-over between a mixed operation and a purely electric operation by providing a continuous transition between a maximum interpolation range and a limited interpolation range.

In other words, in accordance with the invention, there is provided a method for a shift control of a drivetrain of a motor vehicle, wherein an internal combustion engine is connected, via a decoupling clutch, to the input shaft of an automated stepped shift transmission, wherein the shift characteristic curves, which are used for triggering the shifts of the stepped shift transmission, are determined respectively by an interpolation between two limit shift characteristic curves, wherein the drivetrain is embodied as a hybrid drivetrain in which the internal combustion engine and an electric machine are respectively connected to the input shaft of the stepped shift transmission, wherein the shift characteristic curves, that are valid at the moment, are determined respectively in dependence of driving and operating parameters by an interpolation between a first limit shift characteristic curve for a first driving characteristic and a second limit shift characteristic curve for a second driving characteristic, wherein the respective limit shift characteristic curves are identical in all operating modes, in a purely electric operation however, the permissible interpolation range is limited.

By selecting suitable limit shift characteristic curves, which should correspond to driving characteristics that are different yet as extreme as possible and in case of the usual use of a relatively strong internal combustion engine and a relatively weak electric machine are designed mostly for an optimal operation in the pure internal combustion engine operation, the determination of the currently valid shift characteristic curves takes place in the pure internal combustion engine operation, but also in the mixed operation, suitably by utilizing the entire interpolation range between the respective limit shift characteristic curves.

In the purely electric operation however, this interpolation range is limited, as a result of which the shift behavior of the stepped shift transmission is adapted in a simple manner to the operating behavior of the electric machine, which deviates from the operating behavior of the internal combustion engine, and is adapted to the current driving and operation situation. The use of special limit shift characteristic curves for the mixed operation and the electric operation is thereby advantageously avoided.

The limit shift characteristic curves can be selected according to a wide variety of different criteria. Nevertheless, in this context it seems however especially suitable if, in order to determine the respectively valid shift characteristic curves, eco-shift characteristic curves for an especially fuel-efficient driving characteristic and sport-shift characteristic curves for an especially sporty driving characteristic are used as limit shift characteristic curves. By determining correspondingly adapted shift characteristic curves, requirements of a driver for a low fuel consumption, which entails low driving dynamics, as well as requirements for high driving dynamics, which inevitably results in a higher energy consumption, as well as intermediate requirements that are between these extremes, can be optimally fulfilled.

For the practical implementation of the interpolation it is expediently provided that, during a driving operation, driving and operating parameters, which characterize the driver type and/or the driving dynamics of the motor vehicle, are determined and a dynamics factor ($F\_Sp$) is derived from them, wherein the dynamics factor is used as an interpolation value for determining the currently valid shift characteristic curves, wherein a dynamics factor $F\_Sp=0$ means that the valid shift characteristic curves coincide with the respective eco-shift characteristic curves and a dynamics factor $F\_Sp=1$ means that the valid shift characteristic curves coincide with the respective sport-shift characteristic curves. By using the dynamics factor $F\_Sp$ determined in this manner, the currently valid shift characteristic curves for all possible shifts (gear changes) originating from the currently engaged gear, such as upshifts and downshifts with a single gear jump and a multiple gear jump, are calculated from the corresponding limit shift characteristic curves, i.e. eco-shift characteristic curves and sport-shift characteristic curves, in accordance with which then the shifts (gear changes) of the stepped shift transmission are controlled, i.e. triggered. The process for determining the dynamics factor F_Sp and the valid shift characteristic curves is expediently performed in periodic time intervals rather than continuously.

In order to determine the dynamics factor F_Sp, driver-specific driving dynamics data, such as the deflection paths, the deflection speeds, and the operating (actuating) forces, can be detected periodically via position and movement sensors of driving control elements of the motor vehicle, such as the accelerator pedal, the brake pedal and the steering wheel, and can be evaluated in order to derive the dynamics factor F_Sp.

In order to determine the dynamics factor F_Sp, vehicle-specific driving dynamics data, such as the longitudinal (linear) acceleration, the lateral acceleration, and the angular acceleration about the vertical axis (yaw axis) and the longitudinal axis, can be periodically detected, via linear and rotary acceleration sensors of the motor vehicle, and can be evaluated in order to derive the dynamics factor F_Sp.

Limiting the interpolation range in the purely electric operation is advantageously done by restricting the dynamics factor F_Sp to values above a lower limit value F_Sp_min>0 and/or by restricting the dynamics factor F_Sp to values below an upper limit value F_Sp_max<1. Because such a way of limiting the interpolation range can be mathematically carried out in a simple manner, no big expenditures with respect to the control engineering are necessary and the calculation of the valid shift characteristic curves can be carried out quickly.

If the emphasis is on achieving a high drive power during the motor operation of the electric machine and if the emphasis is on achieving a high recuperation and brake power during the generator operation of the electric machine, then the limitation of the interpolation range is expediently done by restricting the dynamics factor F_Sp to values above the lower limit value F_Sp_min (F_Sp≧F_Sp_min). As a result, the shift r.p.m. (revolutions per minute) of the stepped shift transmission and thus the operating range of the electric machine is inevitably moved to higher rotational speeds which, by accepting a reduced electric efficiency, leads to a higher motor power and, respectively, to a higher recuperation and braking efficiency of the electric machine.

If however, for example due to a small storage capacity or a low charge state of the assigned batteries, the emphasis is on a high electric efficiency in the motor operation and in the generator operation of the electric machine, then the limiting of the interpolation range is expediently done by a restriction of the dynamics factor F_Sp to values below the upper limit value F_Sp_max (F_Sp≦F_Sp_max). As a result, the shift r.p.m. of the stepped shift transmission and thus the operating range of the electric machine are inevitably shifted to lower rotational speeds which leads to a higher electric efficiency and thus to a more effective conversion between kinetic energy and electric energy.

In case of a change-over between the pure internal combustion engine operation or the mixed operation and the pure electric operation there is expediently a respective continuous (smooth) transition between the maximum interpolation range and the limited interpolation range, for example in the form of a linear transition via a ramp function.

The limiting of the interpolation range in the pure electric operation can be implemented in that the value range of the dynamics factor F_Sp, that is omitted as a result, is mapped onto the associated limit value (F_Sp_min or F_Sp_max). This means that when determining a dynamics factor F_Sp that is outside of the range restricted by the limit value (F_Sp<F_Sp_min or F_Sp>F_Sp_max), then this value is replaced by the corresponding limit value (F_Sp_min or F_Sp_max), and that when determining a dynamics factor F_Sp that is within the permissible range (F_Sp≧F_Sp_min and/or F_Sp≦F_Sp_max), then this value is maintained without change.

As an alternative to the above described method, it is also possible to implement the limitation of the interpolation range in the pure electric operation in that the maximum value range of the dynamics factor F_Sp is mapped onto the value range that is restricted by limiting the interpolation range. This means that all possible values of the determined dynamics factor (0≦F_Sp≦1) are transferred, in a proportional manner or according to another transfer function, to the remaining range of permissible values (F_Sp_min≦F_Sp≦1 or 0≦F_Sp≦F_Sp_max or F_Sp_min≦F_Sp≦F_Sp_max) or are respectively replaced by a corresponding value.

Other features which are considered as characteristic for the invention are set forth in the appended claims.

Although the invention is illustrated and described herein as embodied in a method for a shift control of a drivetrain of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
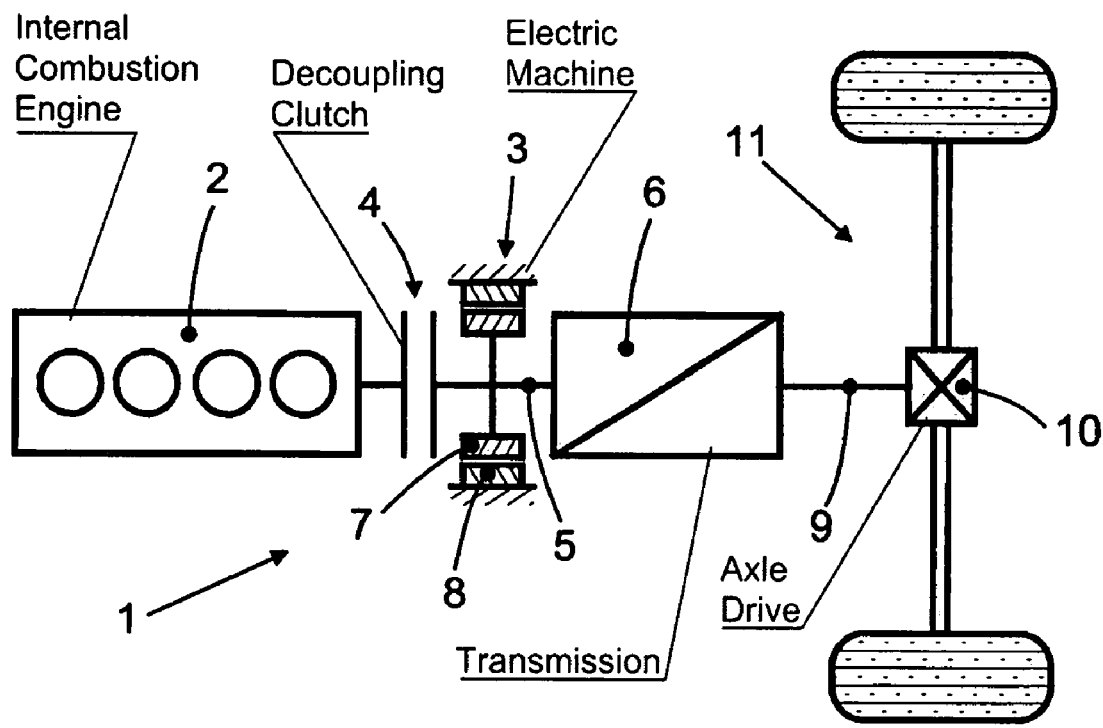
FIG. 3 is a schematic view of a hybrid drivetrain which forms the basis for the invention.

Referring now to the figures of the drawings in detail and first, particularly, to FIG. 3 thereof, there is shown in a schematic manner a typical hybrid drivetrain 1 of a motor vehicle with a parallel arrangement of an internal combustion engine 2 and an electric machine 3 for using the method in accordance with the invention. The internal combustion engine 2 is connected, via a decoupling clutch (interrupting clutch) 4, to the input shaft 5 of an automated stepped shift transmission 6. The rotor 7 of the electric machine 3 and the input shaft 5 of the stepped shift transmission 6 are connected to one another such that they are fixed against relative rotation with respect to one another. The stator 8 of the electric machine 3 is fastened on a housing side thereof. The stepped shift transmission 6 is connected, via an output shaft 9, to the axle drive 10 of a driving axle 11 of the motor vehicle.

The motor vehicle or, to be precise, the hybrid drivetrain 1 can thus be operated in three operating modes, in a pure internal combustion engine operation in which the decoupling clutch 4 is closed and the electric machine 3 is switched to a powerless state, in a mixed operation in which the internal combustion engine 2 is in operation, the decoupling clutch 4 is closed and the electric machine 3 is in operation, and in a pure electric operation in which the internal combustion engine 2 is turned off, the decoupling clutch 4 is opened and the electric machine 3 is in operation.

Figure 1:
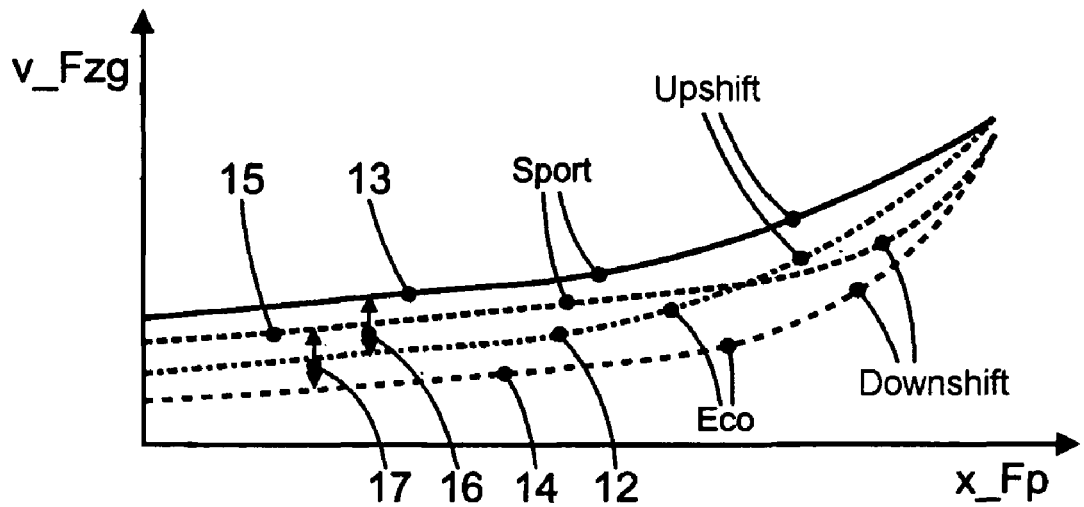
FIG. 1 is a graph illustrating several limit shift characteristic curves in accordance with the invention wherein the diagram plots the speed over the accelerator pedal position.

In a graph of the driving speed v_Fzg plotted over the accelerator pedal position x_Fp for a currently engaged gear, for example the third gear G3, of the stepped shift transmission 6, FIG. 1 displays the shift characteristic curves 12, 13 for a simple upshift, for example from third gear G3 into fourth gear G4, and FIG. 1 displays the shift characteristic curves 14, 15 for a simple downshift, for example from third gear G3 into second gear G2, wherein the shift characteristic curves are respectively shown for an especially economical way of driving (eco-shift characteristic curves 12, 14) and for an especially sporty way of driving (sport-shift characteristic curves 13, 15).

In accordance with the invention, it is provided that a respective shift characteristic curve, that is valid at the moment, is determined in all three modes of operation in dependence of relevant driving and operating parameters, wherein the determination is performed by using a previously determined dynamics factor F_Sp for interpolating between the respective eco-shift characteristic curve 12, 14 and the respective sport-shift characteristic curve 13, 15 which are used as limit shift characteristic curves for this purpose. In this case, the maximum interpolation range 16, 17 is available respectively for the upshift and the downshift in the pure internal combustion engine operation and in the mixed operation.

Figure 2:
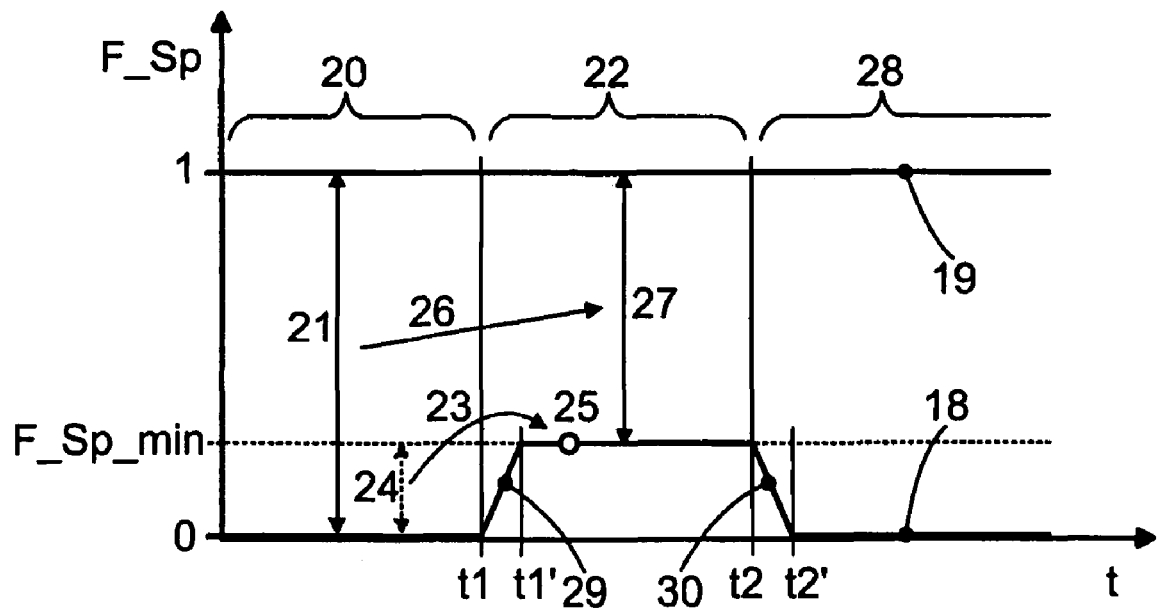
FIG. 2 is a graph illustrating the respective permissible interpolation range in accordance with the invention wherein the diagram plots the dynamics factor over time.

However, in the purely electric operation, the permissible value range of the interpolation is restricted in order to adapt to the special operating properties of the electric machine 3. This is shown in an exemplarily manner in FIG. 2 in a diagram having the dynamics factor F_Sp plotted over the time t wherein the permissible value range is limited by a lower limit 18 and by an upper limit 19.

In the phase 20 that extends up to the time instant t1, the motor vehicle is in the internal combustion engine operation or in the mixed operation in which the maximum possible value range 21, i.e. $0 \leq F\_Sp \leq 1$, of the dynamics factor F_Sp, that is used as an interpolation value, is available. In this case a value F_Sp=0 means the use of the corresponding eco-shift characteristic curve (12, 14), a value F_Sp=1 means the use of the corresponding sport-shift characteristic curve (13, 15) and, for example, a value F_Sp=0.5 means the use of an interpolated shift characteristic curve positioned in the middle between the eco-shift characteristic curve (12, 14) and the sport-shift characteristic curve (13, 15).

In a subsequent phase 22 extending between the time instant t1 and the time instant t2, the permissible value range of the dynamics factor is however limited by a lower limit value F_Sp_min. This limitation can be implemented, as is indicated by arrow 23, by mapping the thus omitted value range 24 of the dynamics factor F_Sp onto the assigned limit value F_Sp_min indicated by reference numeral 25, i.e. all determined values $0 \leq F\_Sp < F\_Sp\_min$ are replaced by the limit value F_Sp_min.

Alternatively, the restriction of the interpolation range can also be implemented, as is indicated by arrow 26, by mapping the maximum value range 21 of the dynamics factor F_Sp onto the restricted value range 27, i.e. all determined values $0 \leq F\_Sp \leq 1$ are replaced, in accordance with a given, preferably linear transfer function, by a new value within the value range 27 defined by $F\_Sp\_min \leq F\_Fsp \leq 1$. As a result, the shift points of the stepped shift transmission 6 are shifted at least partly towards higher driving speeds v_Fzg and, respectively, higher rotational speeds of the electric machine 3, which results in a higher power output of the electric machine 3 in the motor operation and results in a higher recuperation power and braking power of the electric machine 3 in the generator operation.

In the phase 28 subsequent to the time instant t2, the motor vehicle is again driven in the internal combustion engine operation or in a mixed operation. Consequently the maximum possible value range 21 of the dynamics factor F_Sp is then again available. In order to avoid an abrupt transition between the phases 20 and 22 and, respectively 22 and 28, the transition between the maximum interpolation range 21 and the limited interpolation range 27 is in the present case implemented in the form of a temporal ramp function, specifically at the transition from phase 20 to phase 22 the transition is implemented by a rising ramp 29 in the time period t1 to t1', and at the transition from phase 22 to phase 28 by a falling ramp 30 in the time period t2 to t2'.

LIST OF REFERENCE CHARACTERS 1 hybrid drivetrain
2 internal combustion engine
3 electric machine
4 decoupling clutch
5 input-shaft
6 stepped shift transmission
7 rotor
8 stator
9 output shaft
10 axle drive
11 drive axle
12 shift characteristic curve (eco, upshift)
13 shift characteristic curve (sport, upshift)
14 shift characteristic curve (eco, downshift)
15 shift characteristic curve (sport, downshift)
16 (maximum) interpolation range (upshift)
17 (maximum) interpolation range (downshift)
18 limit
19 limit
20 phase
21 maximum interpolation range, maximum value range
22 phase
23 arrow
24 impermissible value range
25 limit value
26 arrow
27 limited interpolation range, restricted value range
28 phase
29 rising ramp
30 falling ramp
F_Sp dynamics factor
F_Sp_max upper limit value
F_Sp_min lower limit value
G2 second gear
G3 third gear
G4 fourth gear
t time
t1 time instant
t1' time instant
t2 time instant
t2' time instant
v_Fzg driving speed
x_Fp accelerator pedal position

What is claimed is:
1. A method for a shift control of a drivetrain, the method which comprises:
providing a drivetrain of a motor vehicle as a hybrid drivetrain wherein an electric machine is connected to an input shaft of an automated stepped shift transmission and wherein an internal combustion engine is connected to the input shaft of the automated stepped shift transmission via a decoupling clutch; and determining currently valid shift characteristic curves used for triggering respective shifts of the automated stepped shift transmission respectively in dependence of current driving and operating parameters by performing an interpolation between a first limit shift characteristic curve for a first driving characteristic and a second limit shift characteristic curve for a second driving characteristic wherein the respective limit shift characteristic curves are identical in all operating modes, however a permissible interpolation range in a purely electric operation is limited.

2. The method according to claim 1, which comprises:

using eco-shift characteristic curves for a particularly economical driving characteristic as limit shift characteristic curves for the first driving characteristic; and using sport-shift characteristic curves for a particularly sporty driving characteristic as limit shift characteristic curves for the second driving characteristic.

3. The method according to claim 2, which comprises:

deriving a dynamics factor from driving and operating parameters determined during a driving operation, the driving and operating parameters characterizing at least one of a driver type and driving dynamics of the motor vehicle; and using the dynamics factor as an interpolation value for determining the currently valid shift characteristic curves wherein a dynamics factor of zero means that the valid shift characteristic curves coincide with respective eco-shift characteristic curves and a dynamics factor of one means that the valid shift characteristic curves coincide with respective sport-shift characteristic curves.

4. The method according to claim 3, which comprises:

periodically detecting driver-specific driving dynamics data by using position and movement sensors of driving control elements of the motor vehicle; and evaluating the driver-specific driving dynamics data in order to derive the dynamics factor.

5. The method according to claim 3, which comprises:

periodically detecting vehicle-specific driving dynamics data by using linear and angular acceleration sensors of the motor vehicle; and evaluating the vehicle-specific driving dynamics data in order to derive the dynamics factor.

6. The method according to claim 3, which comprises limiting the permissible interpolation range in a purely electric operation by restricting the dynamics factor to values above a lower limit value such that the values are greater than zero.

7. The method according to claim 6, which comprises limiting the permissible interpolation range when the electric machine is in a motor operation by restricting the dynamics factor to values above the lower limit value in order to achieve an increased drive power.

8. The method according to claim 6, which comprises limiting the permissible interpolation range when the electric machine is in a generator operation by restricting the dynamics factor to values above the lower limit value in order to achieve an increased recuperation and braking power.

9. The method according to claim 6, which comprises limiting the permissible interpolation range during a motor operation and a generator operation of the electric machine in order to achieve an increased electric efficiency by restricting the dynamics factor to values below the upper limit value.

10. The method according to claim 3, which comprises limiting the permissible interpolation range in a purely electric operation by restricting the dynamics factor to values below an upper limit value such that the values are less than one.

11. The method according to claim 1, which comprises performing a change-over between a purely internal combustion engine operation and a purely electric operation by providing a continuous transition between a maximum interpolation range and a limited interpolation range.

12. The method according to claim 1, which comprises performing a change-over between a mixed operation and a purely electric operation by providing a continuous transition between a maximum interpolation range and a limited interpolation range.

* * * * *